(12) United States Patent
Chan et al.

(10) Patent No.: US 8,732,262 B2
(45) Date of Patent: May 20, 2014

(54) RATE ADAPTIVE AUTO-NEGOTIATION

(75) Inventors: Yiu Lam Chan, Raleigh, NC (US); Clifton Powers, Raleigh, NC (US); Laxman R. Anne, Eden Prairie, MN (US); Derli Chan, Zhongli (TW); Manish Sharma, Eden Prairie, MN (US); Sheng-Chang Hsu, Dayuan (TW)

(73) Assignee: ADC DSL Systems, Inc., Shakopee, MN (US)

( * ) Notice: Subject to any disclaimer, the term of this patent is extended or adjusted under 35 U.S.C. 154(b) by 304 days.

(21) Appl. No.: 13/221,342

(22) Filed: Aug. 30, 2011

(65) Prior Publication Data

US 2013/0054725 A1  Feb. 28, 2013

(51) Int. Cl.
*G06F 13/42* (2006.01)
*H04L 29/06* (2006.01)

(52) U.S. Cl.
CPC .............. *H04L 69/24* (2013.01); *G06F 13/42* (2013.01)
USPC ........... 709/209; 709/208; 709/220; 709/221; 709/228

(58) Field of Classification Search
CPC ................................ H04L 69/24; G06F 13/42
USPC .................. 709/209, 220–222, 227–229, 208
See application file for complete search history.

(56) References Cited

U.S. PATENT DOCUMENTS

| | | | |
|---|---|---|---|
| 6,192,397 B1 | 2/2001 | Thompson | |
| 6,222,854 B1 | 4/2001 | Dove | |
| 7,295,602 B2 | 11/2007 | Thomas | |
| 7,296,085 B2 * | 11/2007 | Engel et al. | 709/237 |
| 7,747,789 B2 * | 6/2010 | Zhou | 710/8 |
| 7,936,778 B2 | 5/2011 | Ungerboeck et al. | |
| 2004/0019694 A1 * | 1/2004 | Engel et al. | 709/237 |
| 2004/0180629 A1 * | 9/2004 | Thomas | 455/73 |
| 2008/0317107 A1 * | 12/2008 | Zhou | 375/222 |
| 2011/0110236 A1 | 5/2011 | Kadambi et al. | |

FOREIGN PATENT DOCUMENTS

EP    1744570    1/2007

OTHER PUBLICATIONS

International Searching Authority, "International Search Report and Written Opinion", from Foreign Counterpart of U.S. Appl. No. 13/221,342, filed Jan. 14, 2013, pp. 18, Published in: WO.

* cited by examiner

*Primary Examiner* — Kenneth Coulter
(74) *Attorney, Agent, or Firm* — Fogg & Powers LLC (57) ABSTRACT

A method to reduce link-up time between nodes in a communication system is provided. The method includes determining a node in the communication system is in a HANDSHAKE state; randomly configuring the node in one of a master mode and a slave mode based on a determination that the node is in the HANDSHAKE state; determining if the node is in a LINK-UP state with a selected node in the communication system based on the random configuring of the node; and randomly re-configuring the node in one of the master mode and the slave mode based on a negative determination that the node is in the LINK-UP state with the selected node.

22 Claims, 8 Drawing Sheets

RATE ADAPTIVE AUTO-NEGOTIATION

BACKGROUND

Some communication systems require two nodes, which are preparing to communicate with each other, to determine which node of the two nodes is to be configured as a master node and which node is to be configured as a slave node. The currently available communication systems can take several minutes to link the nodes.

SUMMARY

The present application relates to a method to reduce link-up time between nodes in a communication system. The method includes determining a node in the communication system is in a HANDSHAKE state; randomly configuring the node in one of a master mode and a slave mode based on a determination that the node is in the HANDSHAKE state; determining if the node is in a LINK-UP state with a selected node in the communication system based on the random configuring of the node; and randomly re-configuring the node in one of the master mode and the slave mode based on a negative determination that the node is in the LINK-UP state with the selected node.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

The nodes and methods of linking nodes described herein includes techniques to reduce the time to enter a LINK-UP state using an auto-negotiation process that is independently performed at each end of the communication link. The auto-negotiation process is a non-deterministic process since each node randomly configures itself as a slave or a master during the auto-negotiation process when the node enters into a HANDSHAKE state. The auto-negotiation process subsequently re-configures itself as a slave or a master during the auto-negotiation process if the node remains in the HANDSHAKE state for more than a randomly selected time. Each node performs the random configuration (and random re-configuration if required) as one of a slave or a master without information indicative of the auto-negotiation process that is ongoing in the node to which the link-up is being attempted.

As defined herein, the HANDSHAKE state is the state of the node during an initial exchange of information between two nodes to determine if they are possibly able to be connected. As defined herein, the power measurement modulation session (PMMS) state is the state of the nodes when the distance between nodes is determined after the handshake has been completed. This state is used when the rate can be adjusted based on the distance between nodes, i.e., in the rate adaptive mode. The PMMS state is also referred to as line probing, when various line parameters (such as distance between nodes) are determined before the actual synchronization process with the peer. As defined herein, the TRAINING state is the state of the node when the node is being configured to communicatively couple to another node. As defined herein, the LINK UP state is the state of the node when the node is communicatively coupled to another node.

The flash file is the last known mode stored in FLASH (e.g., the operation state of the nodes once the node has entered the LINK-UP state). Link cache means last known mode stored in cache (e.g., the operation state of the nodes once the node has entered a PMMS state or a TRAINING state).

Figure 1A:
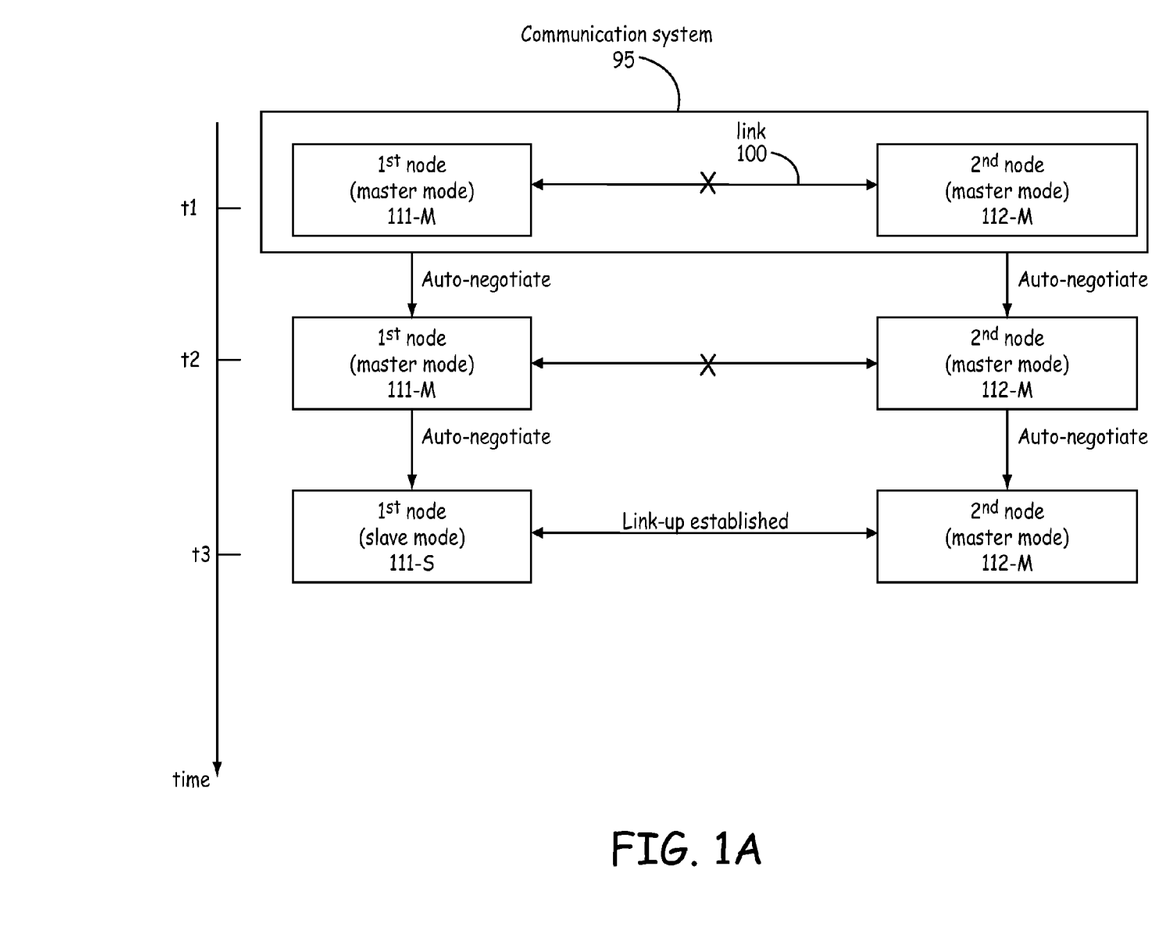
FIGS. 1A-1C are block diagrams of linkup scenarios for two nodes in auto-negotiation in accordance with the present invention.
Figure 1B:
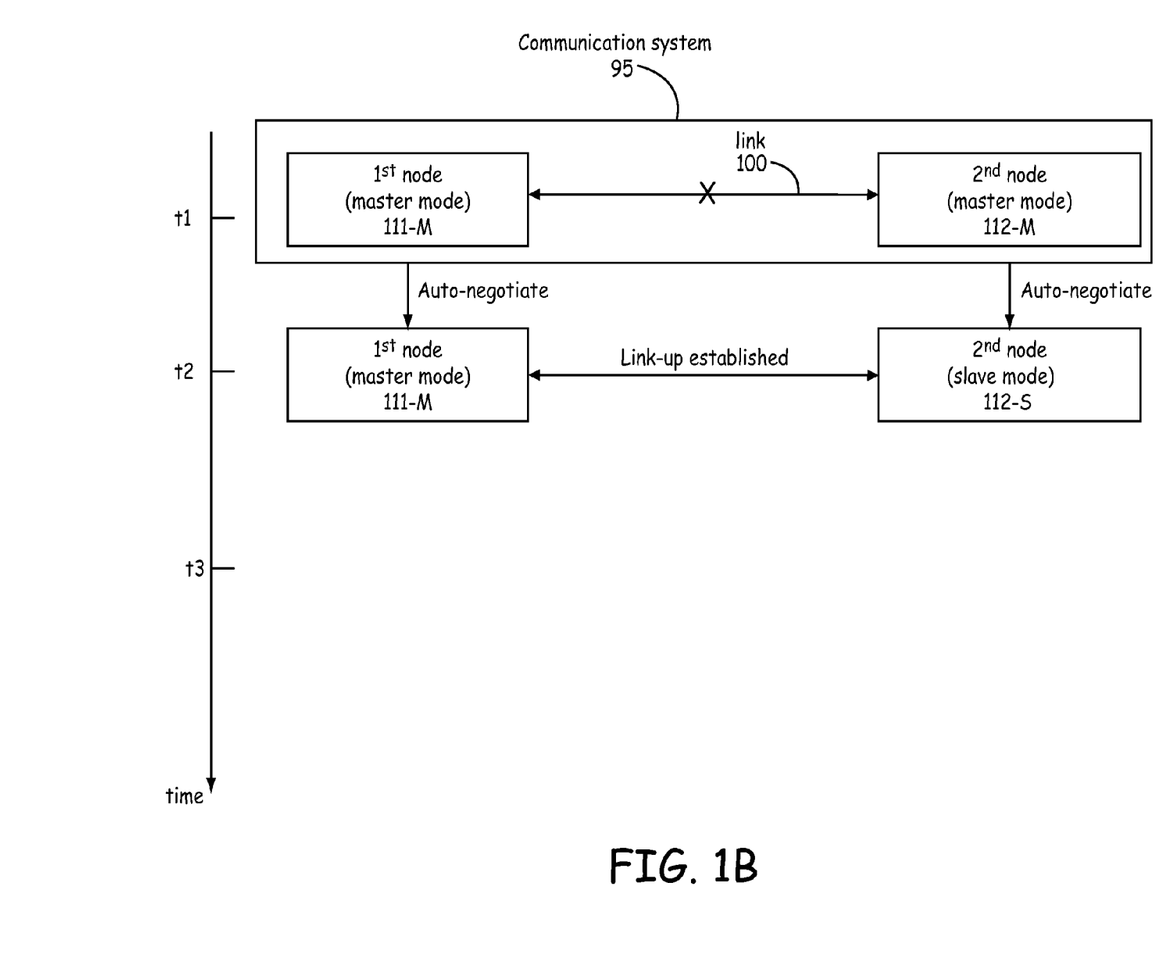
Figure 1C:
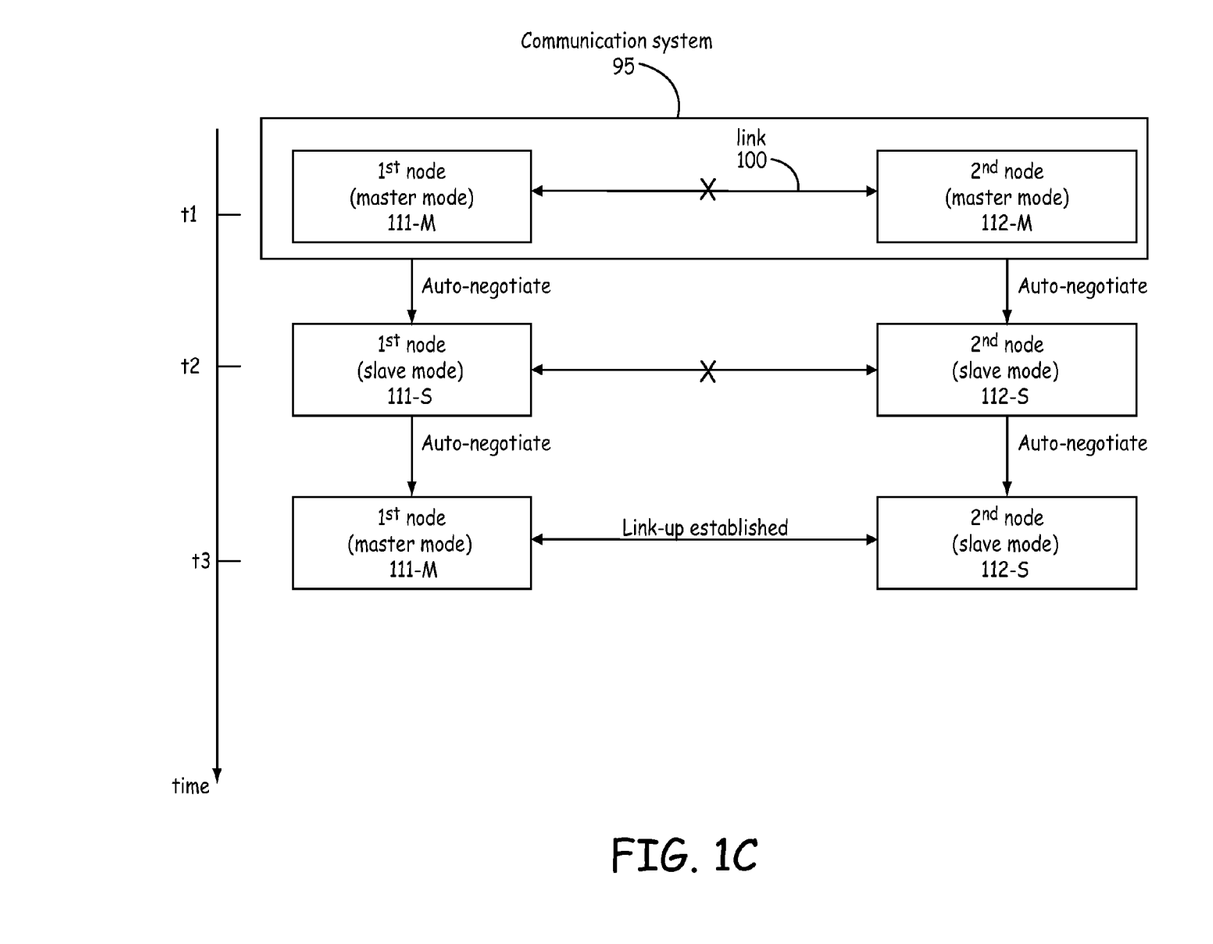

FIGS. 1A-1C are block diagrams of linkup scenarios for two nodes in auto-negotiation in accordance with the present invention. The independence of the nodes in the non-deterministic auto-negotiation process is clearly shown in FIGS. 1A-1C.

The first exemplary scenario for two nodes 111 and 112 in auto-negotiation is shown in FIG. 1A. The first node 111 and the second node 112 are two nodes in a communication system 95 that includes at least the two nodes 111 and 112. At a time $t_1$, the first node 111 is configured in a master mode (M) and the second node 112 is configured in the master mode (M). Two nodes each configured as masters cannot initiate a communicatively coupling link 100. Therefore, the link 100 at time $t_1$ is shown with an X over it to indicate lack of communication between the first node 111-M and the second node 112-M.

After the link 100 did not communicatively couple the first node 111 to the second node 112 at time $t_1$, each of the first node 111 and the second node 112 continues the auto-negotiation process by independently reconfiguring itself in one of the slave mode or the master mode. As shown in the exemplary case of FIG. 1A, at time $t_2$, the first node 111 is again configured in a master mode (M) and the second node 112 is again configured in the master mode (M). Therefore, the link 100 at time $t_2$ is shown with an X over it to indicate lack of communication between the first node 111-M and the second node 112-M.

After the link 100 did not communicatively couple the first node 111 to the second node 112 at time $t_2$, each of the first node 111 and the second node 112 continues the auto-negotiation process by independently reconfiguring itself in one of the slave mode or the master mode. As shown in the exemplary case of FIG. 1A, at time $t_3$, the first node 111 is re-configured in a slave mode (S) and the second node 112 is again configured in the master mode (M). Therefore, the link 100 at time $t_3$ is shown to be enabled with a link-up established to communicatively couple the first node 111-S to the second node 112-M.

The second exemplary scenario for two nodes 111 and 112 in auto-negotiation is shown in FIG. 1B. At a time $t_1$, the first node 111 is configured in a master mode (M) and the second node 112 is configured in the master mode (M). Therefore, the link 100 at time $t_1$ is shown with an X over it to indicate lack of communication between the first node 111-M and the second node 112-M.

After the link 100 did not communicatively couple the first node 111 to the second node 112 at time $t_1$, each of the first node 111 and the second node 112 continue the auto-negotiation process by independently reconfiguring itself in one of the slave mode or the master mode. As shown in the exemplary case of FIG. 1B, at time $t_2$, the first node 111 is again configured in a master mode (M) and the second node 112 is reconfigured in the slave mode (S). Therefore, the link 100 at time $t_2$ is shown to be enabled with a link-up established to communicatively couple the first node 111-M to the second node 112-S.

The third exemplary scenario for two nodes 111 and 112 in auto-negotiation is shown in FIG. 1C. At a time $t_1$, the first node 111 is configured in a master mode (M) and the second node 112 is configured in the master mode (M). Therefore, the link 100 at time $t_1$ is shown with an X over it to indicate lack of communication between the first node 111-M and the second node 112-M.

After the link 100 did not communicatively couple the first node 111 to the second node 112 at time $t_1$, each of the first node 111 and the second node 112 continues the auto-negotiation process by independently reconfiguring itself in one of the slave mode (S) or the master mode (M). As shown in the exemplary case of FIG. 1C, at time $t_2$, the first node 111 is reconfigured in a slave mode (S) and the second node 112 is also reconfigured in the slave mode (S). Therefore, the link 100 at time $t_2$ is shown with an X over it to indicate lack of communication between the first node 111-S and the second node 112-S.

After the link 100 did not communicatively couple the first node 111 to the second node 112 at time $t_2$, each of the first node 111 and the second node 112 continues the auto-negotiation process by independently reconfiguring itself in one of the slave mode or the master mode. As shown in the exemplary case of FIG. 1C, at time $t_3$, the first node 111 is reconfigured in a master mode (M) and the second node 112 is reconfigured in the slave mode (S). Therefore, the link 100 at time $t_3$ is shown to be enabled with a link-up established to communicatively couple the first node 111-M to the second node 112-S.

Figure 2A:
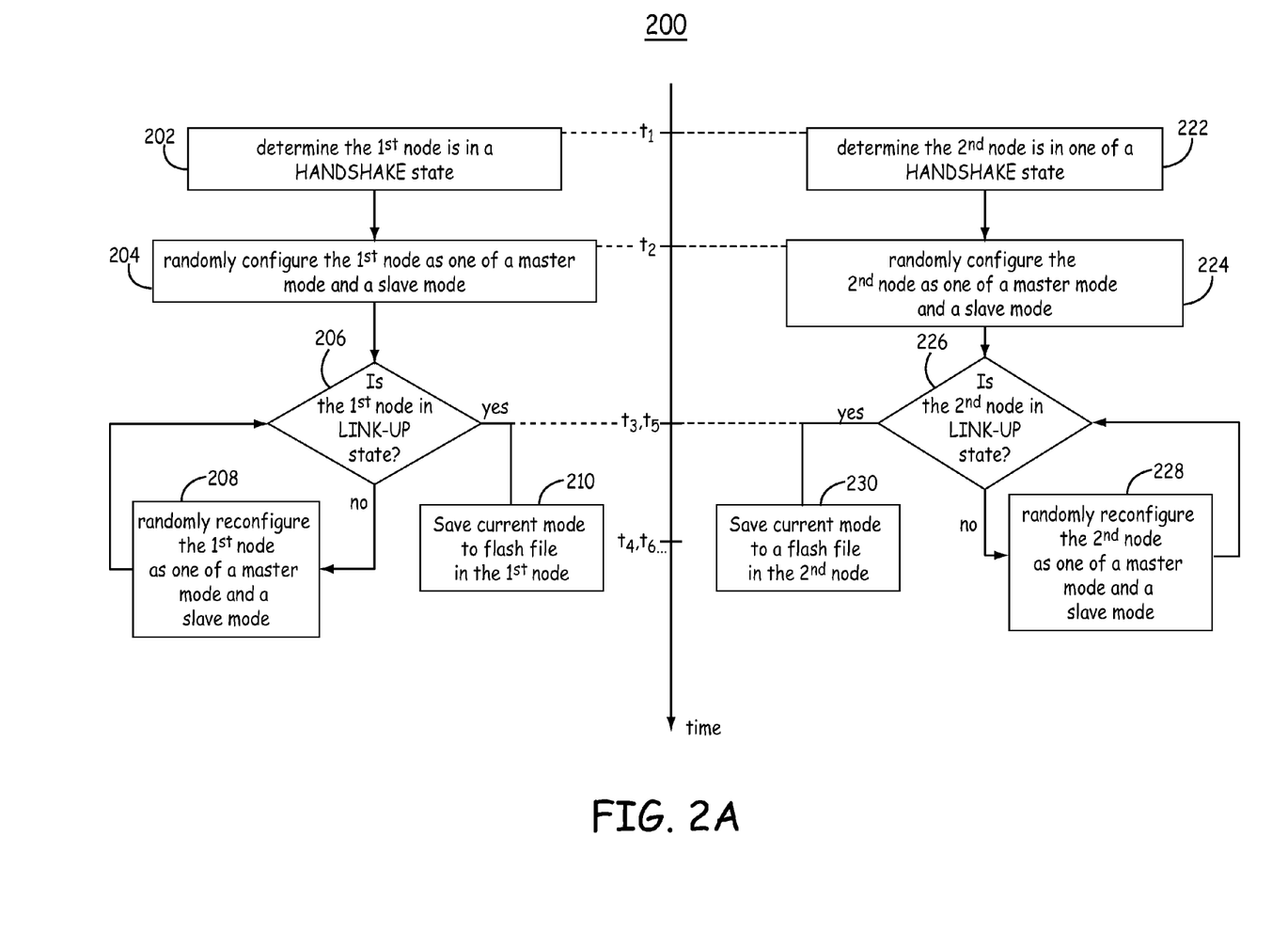
FIG. 2A is a flow diagram of one embodiment of a method to reduce link-up time between a first node and a second node in a communication system in accordance with the present invention.
Figure 2B:
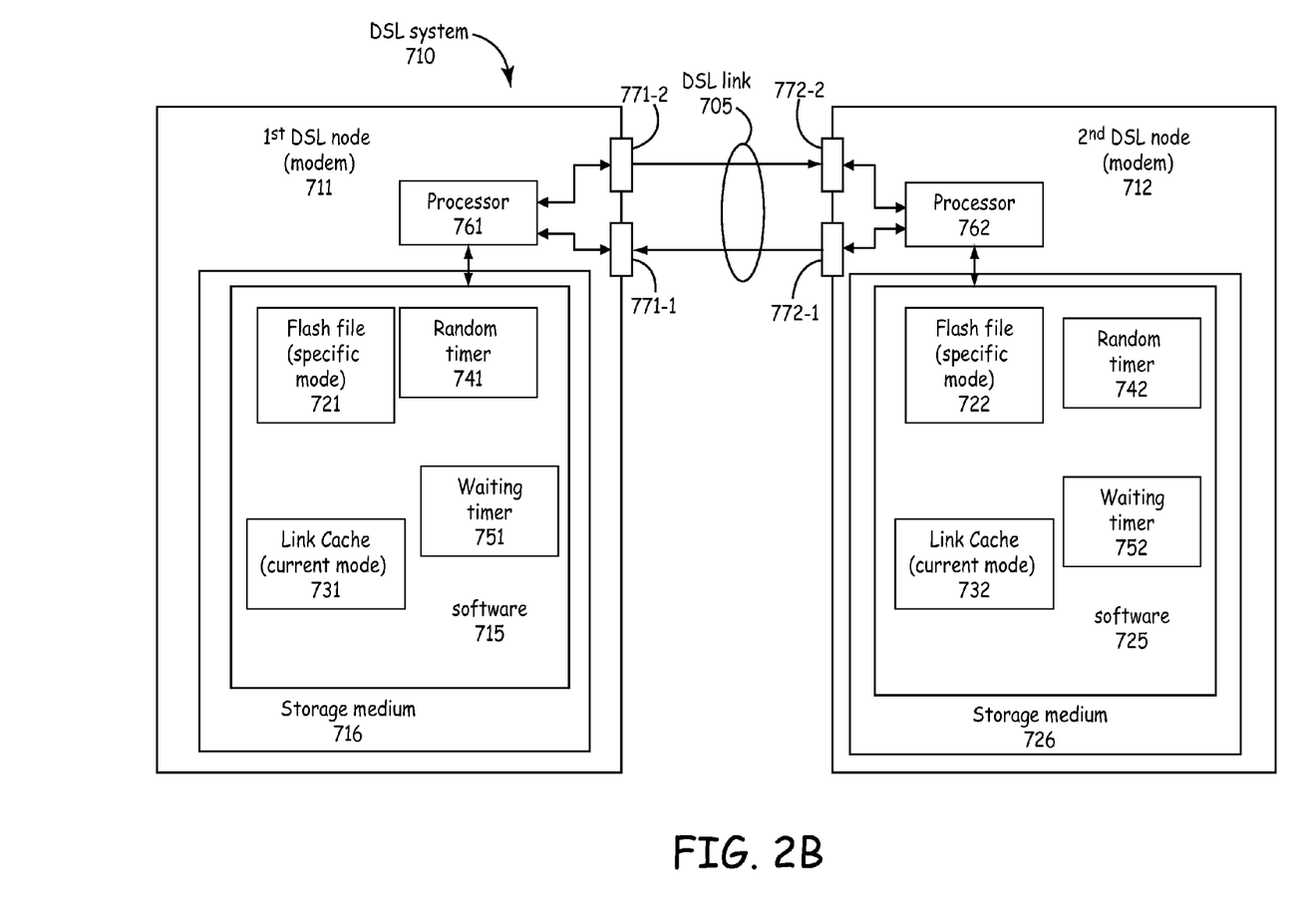
FIG. 2B is a block diagram of digital subscriber line communication system including a first and second digital subscriber line (DSL) nodes communicatively via a DSL link in accordance with the present invention.

FIG. 2A is a flow diagram of one embodiment of a method 200 to reduce link-up time between a first node 111 and a second node 112 in a communication system 95 in accordance with the present invention. FIG. 2B is a block diagram of digital subscriber line communication system 710 including first and second digital subscriber line (DSL) nodes 711 and 712 communicatively via a digital subscriber line (DSL) link 705 in accordance with the present invention.

In one implementation of this embodiment, method 200 of FIG. 2A is implemented by the first and second digital subscriber line (DSL) nodes 711 and 712 shown in FIG. 2B. In another implementation of this embodiment, method 200 of FIG. 2A is implemented by the first node 111 and second node 112 shown in FIGS. 1A-1C. In yet another implementation of this embodiment, the first node 111 and the second node 112 of FIGS. 1A-1C are DSL nodes communicatively coupled by a DSL link 705. In yet another implementation of this embodiment, the first node 711 is a first modem 711 and the second node 712 is a second modem 712. Other embodiments of the first and second node are possible.

As shown in FIG. 2B, the exemplary digital subscriber line communication system 710 includes a first DSL node 711 and a second DSL node 712 communicatively coupled by a DSL link 705.

The first DSL node 711 includes a processor 761, physical layer devices 771(1-2) (for example, ports 771(1-2)) and software 715. The software 715 is stored in non-transitory storage medium 716. The software 715 includes a flash file 721, a link cache 731, a random timer 741, and a waiting timer 751. The physical layer devices 771(1-2) are communicatively coupled to the processor 761. The processor 761 executes the software 715.

The second DSL node 712 includes a processor 762, physical layer devices 772(1-2) and software 725. The software 725 is stored in non-transitory storage medium 726. The software 725 includes a flash file 722, a link cache 732, a random timer 742, and a waiting timer 752. The physical layer devices 772(1-2) are communicatively coupled to the processor 762. The processor 762 executes the software 725.

The link caches 731 and 732 store the current mode of the respective first and second nodes 711 and 712 when the current states of the respective first and second nodes 711 and 712 are in one of a power measurement modulation session (PMMS) state or a TRAINING state. The flash files 721 and 722 store the current mode of the respective first and second nodes 711 and 712 when the current state of the respective first and second nodes 711 and 712 enters a LINK-UP state. The mode saved in the flash files 721 and 722 are referred to herein as a "specific mode" since this is the mode in which the first node 111 and second node 112 are communicatively coupled to each other. The mode saved in the link caches 731 and 732 is a "current mode" since this is the mode in which the first node 111 and second node 112 are in the auto-negotiation process to communicatively couple to each other.

The waiting timers 751 and 752 limit the auto-negotiation time if the connection is lost between the first and second nodes 711 and 712 during the establishment of the link between the first and second nodes 711 and 712. For example, the connection may be lost by a glitch in the communication system 710. The random timers 741 and 742 are randomly set based on the random configuring of the respective first and second nodes 711 and 712 in one of the master mode or the slave mode.

The physical layer device (port) 771-1 of the first DSL node 711 is communicatively coupled to receive signals from the physical layer device (port) 772-1 of the second DSL node 712. The physical layer device (port) 772-2 of the second DSL node 712 is communicatively coupled to receive signals from the physical layer device (port) 771-2 of the first DSL node 711. In one implementation of this embodiment, the nodes each include one communicatively coupled physical layer device so the node are bidirectionally communicatively coupled to each other.

In one implementation, the processor 761/762 comprises a microprocessor or microcontroller. Moreover, although the processor and timers are shown as separate elements in FIG. 2B in one implementation, the processor 761/762, the random time 741/742, and the waiting timer 751/752 are implemented in a single device (for example, a single integrated-circuit device). In one implementation, the processor 761/762 comprises processor support chips and/or system support chips such as ASICs. The processor 761/762 executes instructions to implement software 715/725 and/or firmware that cause the processor 761/762 to perform at least some of the processing described here as being performed by the system, such as system 710. At least a portion of such software 715/725 and/or firmware executed by the processor 761/762 and any related data structures are stored in storage medium 716/726 during execution. The software 715/725 and/or firmware executed by the processor 761/762 comprises a plurality of program that are stored or otherwise embodied on a storage medium 716/726 from which at least a portion of such program instructions are read for execution by the processor 761/762. In one implementation, the processor 761/762 comprises processor support chips and/or system support chips such as ASICs.

The method 200 is now described with reference to the system 95 of FIGS. 1A-1C in which the first node 111 and the second node 112 are is similar in structure to the first node 711 and the second node 712 of FIG. 2B. The method 200 to reduce a link-up time between a first node 111 and a second node 112 in a communication system 95 is performed independently at each of the first node 111 and the second node 112. Specifically, each node performs the random configuration (and random re-configuration if required) as one of a slave or a master without information indicative of the auto-negotiation process that is ongoing in the other node to which the link-up is being attempted in a non-deterministic process. This differs from a prior art deterministic process in which the first node 111 determines if the second node 112 is configured in the slave mode or the master mode and then, if they are configured in the same mode, one or both reconfigures and they check again.

At block 202, the first node 111 in the communication system 95 determines the first node 111 is in a HANDSHAKE state. At block 222, the second node 112 in the communication system 95 determines the second node 112 is in a HANDSHAKE state. Both block 202 and 222 take place at or about the same time, such as time $t_1 \pm \Delta t$. In one implementation of this embodiment, $\Delta t$ is less than 1 second. In another implementation of this embodiment, $\Delta t$ is less than 10 seconds. In this exemplary case, the first node 111 is a selected node for the second node 112 and the second node 112 is a selected node for the first node 111. As defined herein, a selected node is a node to which a node is trying to communicatively couple.

At block 204, the first node 111 is randomly configured in one of a master mode (M) and a slave mode (S) based on a determination at block 202 that the first node 111 is in the HANDSHAKE state. At block 224, the second node 112 is randomly configured in one of a master mode (M) and a slave mode (S) based on a determination at block 222 that the second node 112 is in the HANDSHAKE state. Both block 204 and 224 take place at or about the same time, such as time $t_2 \pm \Delta t$. The first node 111 does not use any information about the mode of the second node 112 in generating the random configuration. Likewise, the second node 112 does not use any information about the first node 111 in generating the random configuration.

At block 206, the first node 111 determines if it is in a LINK-UP state. At block 226, the second node 112 determines if it is in a LINK-UP state. Both block 206 and 226 take place at or about the same time, such as time $t_3 \pm \Delta t$. If the first node 111 and second node 112 are configured in the same mode (M or S), then, as shown in FIGS. 1A-1C, the first node 111 and second node 112 cannot enter a LINK-UP state with each other.

If the first node 111 determines it is not in a LINK-UP state at block 206, the flow proceeds to block 208. At block 208, the first node 111 is randomly reconfigured in one of a master mode (M) and a slave mode (S). If the second node 112 determines it is not in a LINK-UP state at block 226, the flow proceeds to block 228. At block 228, the second node 112 is randomly reconfigured in one of a master mode (M) and a slave mode (S). Both blocks 208 and 228 take place at or about the same time, such as time $t_4 \pm \Delta t$. If there is a negative determination two times at block 206, then blocks 208 and 228 take place again at or about the same time, such as time $t_6 \pm \Delta t$.

If the first node 111 determines it is in a LINK-UP state at block 206, the flow proceeds to block 210. At block 210, the processor 761 in the first node 111 saves the current mode to a flash file 721 as a specific mode. If the second node 112 determines it is in a LINK-UP state at block 226, the flow proceeds to block 230. At block 230, the processor 762 in the second node 112 saves the current mode to a flash file 722 as specific mode. Both blocks 210 and 230 take place at or about the same time, such as time $t_4 \pm \Delta t$. If there is a negative determination the first time the flows proceed through block 206 and block 226 and a positive determination the second time the flows proceed through block 206 and block 226, then block 210 and block 230 take place at or about the same time, such as time $t_6 \pm \Delta t$. If there is a negative determination the first two times the flows proceed through block 206 and block 226, and a positive determination the third time the flows proceed through block 206 and block 226 then block 210 and block 230 takes place at or about the same time, such as time $t_8 \pm \Delta t$. In this manner, the link-up time between the first node 111 and the second node 112 is reduced.

Figure 3:
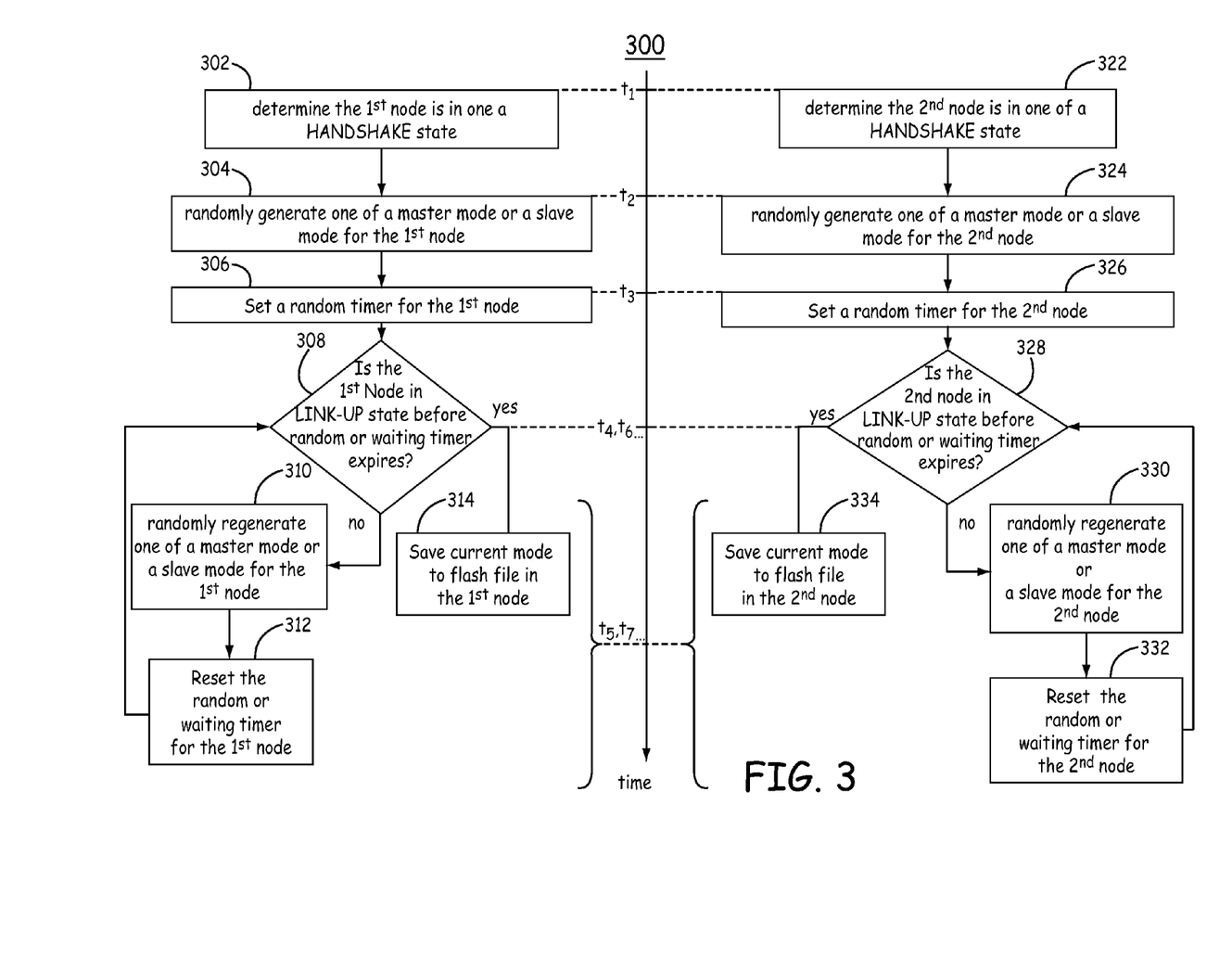
FIG. 3 is a flow diagram of one embodiment of a method to reduce link-up time between a first node and a second node in a communication system in accordance with the present invention.

FIG. 3 is a flow diagram of one embodiment of a method 300 to reduce link-up time between a first node 111 and a second node 112 in a communication system 95 in accordance with the present invention. In one implementation of this embodiment, method 300 of FIG. 3 is implemented by the first and second digital subscriber line (DSL) nodes 711 and 712 shown in the communication system 710 shown in FIG. 2B. In another implementation of this embodiment, method 300 of FIG. 3 is implemented by the first node 111 and second node 112 shown in FIGS. 1A-1C similar in structure and function to the first node 711. The method 300 is now described with reference to the system 95 of FIGS. 1A-1C in which the first node 111 and the second node 112 are is similar in structure to the first node 711 and the second node 712 of FIG. 2B.

The method 300 to reduce link-up time between a first node 111 and a second node 112 in a communication system 95 is performed independently at each of the first node 111 and the second node 112. Specifically, each node performs the random configuration (and random re-configuration if required) as one of a slave or a master without information indicative of the auto-negotiation process that is ongoing in the other node to which the link-up is being attempted in a non-deterministic process.

At block 302, the first node 111 in the communication system 95 determines the first node 111 is in a HANDSHAKE state. At block 322, the second node 112 in the communication system 95 determines the second node 112 is in a HANDSHAKE state. Both block 302 and 322 take place at or about the same time, such as time $t_1 \pm \Delta t$. In this exemplary case, the first node 111 is a selected node for the second node 112 and the second node 112 is a selected node for the first node 111.

At block 304, the first node 111 is randomly generated (configured) in one of a master mode (M) and a slave mode (S) based on a determination at block 302 that the first node 111 is in the HANDSHAKE state. At block 324, the second node 112 is randomly generated (configured) in one of a master mode (M) and a slave mode (S) based on a determination at block 322 that the second node 112 is in the HANDSHAKE state. Both block 304 and 324 take place at or about the same time, such as time $t_2 \pm \Delta t$. The first node 111 does not use any information about the mode of the second node 112 in generating the random configuration. Likewise, the second node 112 does not use any information about the first node 111 in generating the random configuration. The configuration of the mode of a node is also referred to herein as the generation of the mode of the node.

At block 306, a random timer 741 for the first node 111 is set based on the random configuring of the first node 111 in one of the master mode and the slave mode. Once the first node 111 is randomly configured in master mode or in slave mode, the random timer 741 is set with a randomly generated time.

At block 326, a random timer 742 for the second node 112 is set based on the random configuring of the second node 112 in one of the master mode and the slave mode. Once the second node 112 is randomly configured in master mode or in slave mode, the random timer 742 is set with a randomly generated time. The randomly generated time in the random time 742 in the second node 112 is independent of the randomly generated time in the random time 741 in the second node 112. Both block 306 and 326 take place at or about the same time, such as time $t_3 \pm \Delta t$.

At block 308, the first node 111 determines if it is in a LINK-UP state before the random timer 741 or waiting timer 751 expires. At block 328, the second node 112 determines if it is in a LINK-UP state before the random timer 742 or waiting timer 752 expires. Both block 308 and 328 take place at or about the same time, such as time $t_4 \pm \Delta t$. If the first node 111 and second node 112 are configured in the same mode (M or S), then, as shown in FIGS. 1A-1C, the first node 111 and second node 112 cannot enter a LINK-UP state with each other.

If the first node 111 determines it is not in a LINK-UP state at block 308, the flow proceeds to block 310. At block 310, the first node 111 is randomly regenerated (reconfigured) in one of a master mode (M) and a slave mode (S). The flow of method 300 then proceeds to block 312. At block 312, the random timer 741 or waiting timer 751 in the first node 111 is reset based on the random regenerating (reconfiguring) of the first node 111 in one of the master mode and the slave mode. From block 312, the flow of method 300 proceeds to block 308. If there is a negative determination the first time the flow of method 300 proceeds through block 308, then blocks 310 and 312 take place at or about the time $t_5 \pm \Delta t$. If there is a negative determination two times (twice) at block 308, then blocks 310 and 312 take place again, at or about the time $t_7 \pm \Delta t$.

If the second node 112 determines it is not in a LINK-UP state at block 328, the flow proceeds to block 330. At block 330, the second node 112 is randomly regenerated (reconfigured) in one of a master mode (M) and a slave mode (S). The flow of method 300 then proceeds to block 332. At block 332, the random timer 742 or waiting timer 752 in the second node 112 is reset based on (after) the random regenerating (reconfiguring) of the second node 112 in one of the master mode and the slave mode. From block 332, the flow of method 300 proceeds to block 328. If there is a negative determination the first time the flow of method 300 proceeds through block 328, then blocks 330 and 332 take place at or about the time $t_5 \pm \Delta t$. If there is a negative determination two times (twice) at block 328, then blocks 330 and 332 take place again, at or about the time $t_7 \pm \Delta t$.

If the first node 111 determines it is in a LINK-UP state at block 308, the flow proceeds to block 314. At block 314, the flash file 721 in the first node 111 is set to (saved as) the current mode, based on the determination that the first node 111 is in the LINK-UP state with the selected (second) node 112.

If the second node 112 determines it is in a LINK-UP state at block 328, the flow proceeds to block 334. At block 334, the flash file 722 in the second node 112 is set (saved as) to the current mode, based on the determination that the second node 112 is in the LINK-UP state with the selected (first) node 111. In this manner, the link-up time between the first node 111 and the second node 112 is reduced.

Figure 4:
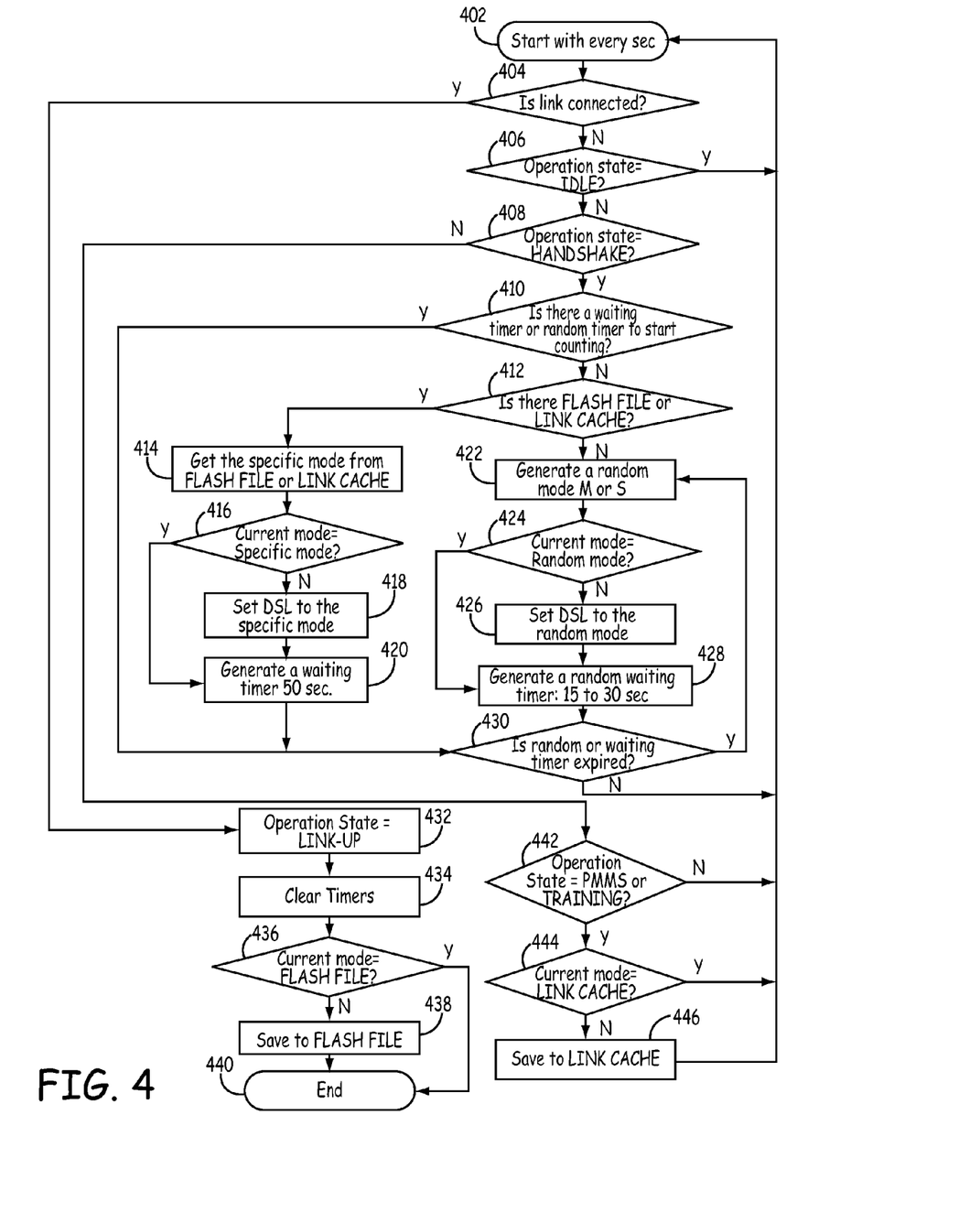
FIG. 4 is a flow diagram of one embodiment of a method to reduce link-up time between a first node and a second node in a communication system in accordance with the present invention.

FIG. 4 is a flow diagram of one embodiment of a method 400 to reduce link-up time between a first node 111 and a second node 112 in a communication system 95 in accordance with the present invention. Method 400 outlines the dependence upon the state of a node in reducing the link-up time between the node and another node.

There are four or five operation states for the nodes in the communication systems 95 and 711. The term "operation state" is also referred to herein as "state". A node is in the IDLE state when the node is not communicatively coupled to another node, and when the node is not trying to link-up to another node. During a link-up process, the first operation state is the HANDSHAKE state. After the HANDSHAKE state is completed, the node moves into a power measurement modulation session (PMMS) state. The PMMS state is only used for those nodes that work in a rate adaptive mode. A rate adaptive mode is used in systems in which the distance between nodes, which have completed the HANDSHAKE state, is required to set the bandwidth or rate of the node. Once the distance between nodes is used to set the rate of the node, the node moves from the PMMS state to the TRAINING state. The TRAINING state prepares the linked nodes to enter the LINK-UP state. All nodes or modems go through the HANDSHAKE state, the TRAINING state, and the LINK-UP state. Some nodes or modems go through the HANDSHAKE state, the PMMS state, the TRAINING state, and the LINK-UP state. The nodes that pass into the LINK-UP state are communicatively coupled to transmit signals to each other.

The method 400 is now described with reference to the system 95 of FIGS. 1A-1C in which the first node 111 is establishing a link with another node, such as, second node 112. The method 400 is also implemented in the second node 112 when the first node 111 is establishing a link with the second node 112. In this exemplary embodiment, the first node 111 and second node 112 are similar in structure to the first node 711 and the second node 712, respectively, of FIG. 2B. At block 402, a periodic cycle is initiated. In the embodiment of method 400, shown in FIG. 4, the periodic cycle is initiated every second. In one implementation of this embodiment, the periodic cycle is initiated based on a selected time that is between 1 and 10 seconds. In another implementation of this embodiment, the periodic cycle is initiated based on a selected time that is between 1 and 5 seconds. The smaller the selected time, the finer the granularity of the process and the faster the link-up is established on average.

At block 404, the processor 761 determines if the link between the first node 111 and the second node 112 is connected. If the processor 761 determines the link between the first node 111 and the second node 112 is not connected, the flow proceeds to block 406. At block 406, the processor 761 determines if the first node 111 is in the IDLE state. If the processor 761 determines the first node 111 is not in the IDLE state, the flow proceeds to block 408. If the processor 761 determines the first node 111 is in the IDLE state, the flow proceeds to block 402 to continue another cycle through method 400. As long as the first node 111 remains in the IDLE state, the flow will cycle through block 402 to block 404 to block 406.

At block 408, the processor 761 determines if the first node 111 is in the HANDSHAKE state. If the processor 761 determines the first node 111 is in the HANDSHAKE state, the flow proceeds to block 410. At block 410, the processor 761 determines if there is a timer to start counting. If the processor 761 determines there is no waiting timer 751 or random timer 741 to start counting, the flow proceeds to block 412. In one implementation of this embodiment, the function of block 410 like a flag to check if the (random or fixed) timer has started to count. For an example, if the flag is cleared, the program regenerates a random M/S mode. If the flag is set, the program checks if the timer is timeout. When a timer timesout, the flag is cleared.

At block 412, the processor 761 determines if there is a mode indicated in a link cache 731 or a flash file 721. If the processor 761 determines there is no mode indicated in the link cache 731 or the flash file 721, the flow proceeds to block 422.

At block 422, the processor 761 randomly configures (generates) the first node 111 in one of a master mode (M) and a slave mode (S). In one implementation of this embodiment, the processor 761 uses a random number generator to select the mode type for the first node 111. This random configuration is based on the determination that the node is in the HANDSHAKE state. The newly generated mode is referred to herein as the "random mode" of the first node 111. If the mode had been in either of the slave mode or master mode prior to the process of block 422, that mode is referred to herein as the "current mode". Then, the flow proceeds to block 424.

At block 424, the processor 761 determines if the current mode of the first node 111 is the same as the random mode that was randomly generated during the last pass through block 422. The random mode that was randomly generated during the last pass through block 422 is referred to herein as the last-generated-random configuration of the node. If the processor 761 determines the current mode of the first node 111 is not the same as the random mode, the flow proceeds to block 426. At block 426, the processor 761 sets the first node 111 to the random mode. Once block 426 is completed, the current mode of the first node 111 is the same as the random mode. Then the flow proceeds to block 428.

If, at block 424, the processor 761 determines the current mode of the first node 111 is the same as the random mode, the flow proceeds to block 428.

Figure 5:
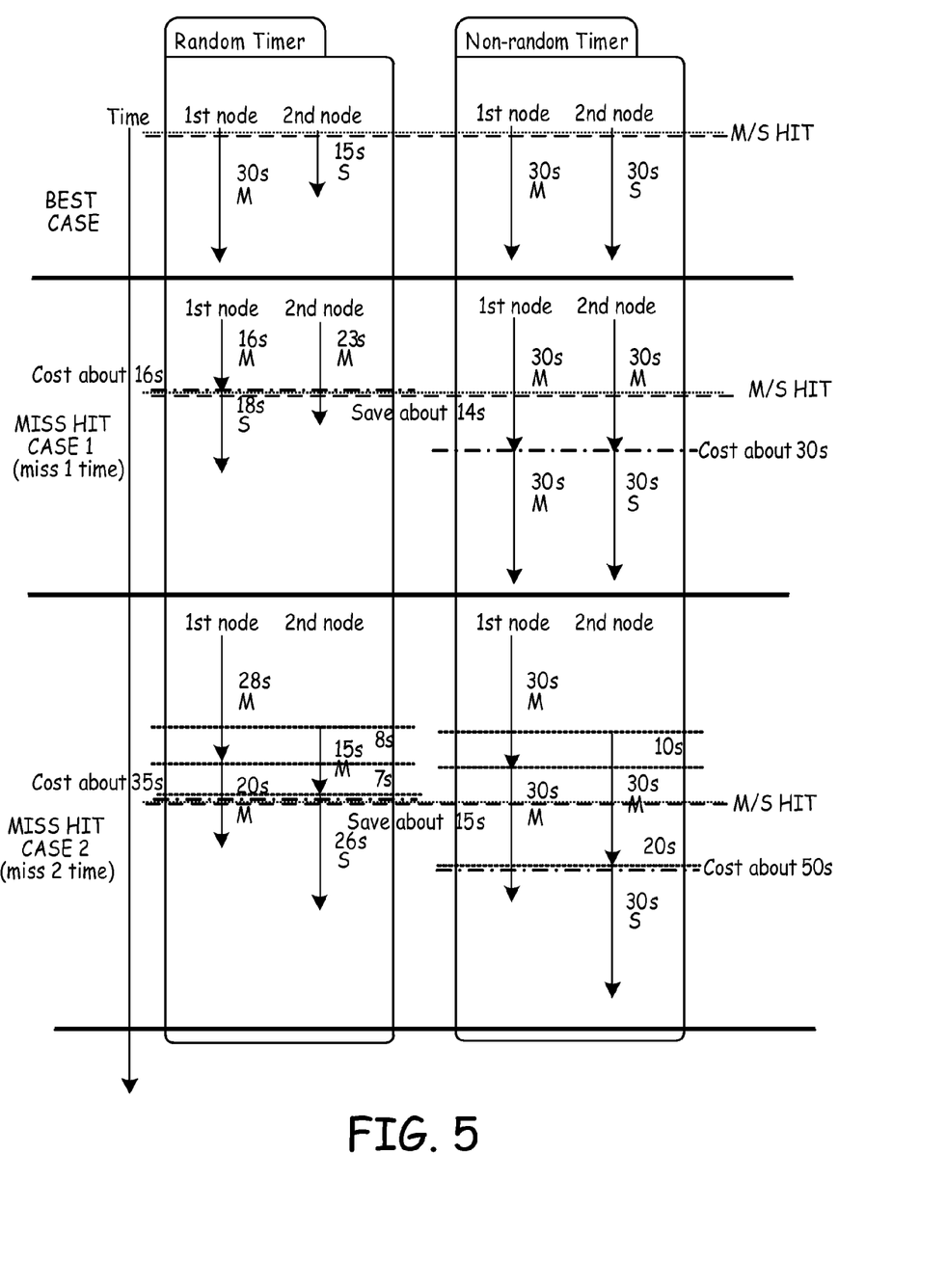
FIG. 5 illustrates how implementation of a random timer reduces the link-up time in a communication system in accordance with the present invention.

At block 428, the processor 761 sets a random timer 741 in the first node 111. In the embodiment shown in FIG. 4, the random timer 741 is set to some duration between 15 seconds and 30 seconds. Other time ranges are possible. In one implementation of this embodiment, the duration of time set on the random time 741 is associated with the random number generated at block 422 that was also used to set the mode of the first node 111. The implementation of the random time 741 increases the probability of reducing the link-up time. Exemplary scenarios in which the random timer 741 reduces the link-up time are shown in FIG. 5 as described below. From block 428, the flow of method 300 proceeds to block 430.

At block 430, the processor 761 determines if the waiting timer 751 or random timer 741 are expired. If the processor 761 determines the waiting timer 751 or random timer 741 are not expired, the flow proceeds to block 402 to continue another cycle through method 400.

At block 404, if the processor 761 determines the link between the first node 111 and the second node 112 is connected, the flow proceeds to block 432. At this point, the first node 111 and the selected node, such as second node 112, are communicatively coupled. At block 432, the processor 761 sets the operation state of the first node 111 as the LINK-UP state. At block 434, the timers (e.g., waiting timer 751 and random timer 741) are cleared. At block 436, the processor 761 determines if the current mode is the same as the mode saved in the flash file 721.

If the processor 761 determines the current mode is not the same as the mode saved in the flash file 721, the flow proceeds to block 438. At block 438, a flash file 721 in the first node 111 is set to the current mode. In this manner, the current state, e.g., LINK-UP state, is saved in the flash file 721. This setting of the flash file 721 to the current mode is based on the determination that the node is in the LINK-UP state with the selected node, for example, second node 112. Then the flow proceeds to block 440 and the flow of method 400 ends.

If the processor 761 determines the current mode is the same as the mode saved in the flash file 721, the flow proceeds to block 440 and the flow of method 400 ends.

At block 408, if the processor 761 determines the first node 111 is not in the HANDSHAKE state, the flow proceeds to block 442. At this point, the HANDSHAKE state was completed. If the HANDSHAKE state was unsuccessfully completed, the first node 111 will have reverted to the IDLE state to wait to move back into HANDSHAKE state, perhaps with a different node. If the HANDSHAKE state was successfully completed, the first node 111 has proceeded to the next operational state, e.g., the PMMS state or the TRAINING state.

At block 442, the processor 761 determines if the first node 111 is in either the PMMS state or the TRAINING state. If the processor 761 determines the first node 111 is not in either the PMMS state or the TRAINING state, the flow proceeds back to block 402 and the flow proceeds to block 402 to continue another cycle through method 400. If the processor 761 determines the first node 111 is in the PMMS state or the TRAINING state, the flow proceeds to block 444. At block 444, the processor 761 determines if the current mode of the first node 111 is the same as the mode stored in a link cache 731. The last-generated-random configuration of the first node 111 is the current mode. If the processor 761 determines if the current mode of the first node 111 is the same as the mode stored in a link cache 731, the flow proceeds to block 402 and the flow proceeds to block 402 to continue another cycle through method 400. If the processor 761 determines if the current mode of the first node 111 is not the same as the mode stored in a link cache 731, the flow proceeds to block 446.

At block 446, the link cache 731 in the first node 111 is set to the current mode. The current mode is saved to the link cache 731. The saving of the current mode to the link cache is based on the determination that the first node 111 is in one of the PMMS state or the TRAINING state. Then the flow proceeds to block 402 to continue another cycle through method 400.

At block 410, if the processor 761 determines there is a timer to start counting, the flow proceeds to block 430. At block 430, the processor 761 determines if the waiting timer 751 or random timer 741 is expired. If the processor 761 determines the waiting timer 751 or random timer 741 is not expired, the flow proceeds to block 402 to continue another cycle through method 400. If the processor 761 determines the waiting timer 751 or random timer 741 is expired, the flow proceeds to block 422.

At block 412, if the processor 761 determines there is a mode indicated in the link cache 731 or the flash file 721, the flow proceeds to block 414. At this point in the flow, the first node 111 is in the HANDSHAKE state, the timers (either the random timer 741 or the waiting timer 751) are not counted down, and there is a mode (master or slave) stored in one of the flash file 721 or the link cache 731. The first node 111 arrives at this point if a glitch in the link between the communicatively coupled nodes causes the nodes to go back to HANDSHAKE state. At block 414, the processor 761 retrieves the specific mode from the flash file 721.

At block 416, the processor 761 determines if the current mode of the first node 111 is the same as the specific mode that was stored in the flash file 721. If the processor 761 determines the current mode of the first node 111 is not the same as the specific mode that was stored in the flash file 721, the flow proceeds to block 418. At block 418, the processor 761 sets the first node 111 to the specific mode. Then the flow proceeds to block 420 and a waiting timer is set to a fixed pre-selected time since the LINK-UP state has been disrupted by the glitch. In the embodiment shown in FIG. 4, the waiting timer 751 is set for 50 seconds. Other waiting times are possible. The flow then proceeds to block 430. At block 430, the processor 761 determines if the waiting timer 751 is expired. If the processor 761 determines the waiting timer 751 is not expired, the flow proceeds to block 402 to continue another cycle through method 400.

FIG. 5 illustrates how implementation of a random timer 741 reduces the link-up time the link-up time in a communication system in accordance with the present invention. FIG. 5 shows time progressing from top to bottom of the page. The arrows in the left-hand column under the label "random timer" and under the respective label "first node" and "second node" each have a length that is indicative of the time set on the random timer. Since the timer is random, the arrows under the "Random Timer" column are variable in length. The arrows in the right-hand column under the label "Non-random Timer" and under the respective label "first node" and "second node" each have the same length of time equal to an exemplary 30 seconds.

HIT means the two nodes that are being linked are set in opposite mode, i.e., master/slave or M/S. MISS HIT means the two nodes that are being linked are set in the same mode, i.e., master/master (M/M) or slave/slave (S/S).

The scenarios in the left-hand columns under the "Random Timer" heading are indicative of exemplary link-up situations for method 300 as shown in FIG. 3. The scenarios in the right-hand columns under the "Non-random Timer" heading are indicative of exemplary link-up situations for method 200 as shown in FIG. 2A. All the scenarios, on average, result in reduced link-up time over the link-up time required in a prior art communication system.

As shown in the "best case" scenario, the first and second nodes in the random-timer embodiment are randomly set to opposite modes and the link-up occurs after 15 second. As shown in the "best case" scenario, the first and second nodes under the non-random-timer embodiment are also randomly set to opposite modes and the link-up occurs after 30 second. The random-timer embodiment saved 15 seconds over the non-random timer embodiment.

In the "miss hit case 1" scenario the first and second nodes are first set to the same mode and then set to opposite modes. The first node in the random-timer embodiment changes to a slave mode after 16 second and a link-up is then established after about 16 seconds. The first node and the second node in the non-random-timer embodiment are set to different modes after 30 seconds. Thus, the random timer saves 14 seconds of link-up time in this "miss hit case 1" scenario.

In the "miss hit case 2" scenario, the first and second nodes initiate the auto-negotiation at different times. The second node initiates auto-negotiation about 20 seconds after the first node initiates auto-negotiation. The second time the mode of second node is randomly configured the nodes are in different modes. As shown in this exemplary scenario, the random timer saves 15 seconds of link-up time in this "miss hit case 2" scenario.

The embodiments of the nodes, the communication systems, and the methods described herein reduce the time to link-up end nodes on a communication link in a non-deterministic manner.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method to reduce link-up time between nodes in a communication system, the method comprising:
   determining a node in the communication system is in a HANDSHAKE state at a processor in the node;
   randomly configuring the node in one of a master mode and a slave mode based on a determination that the node is in the HANDSHAKE state at the processor;
   determining if the node is in a LINK-UP state with a selected node in the communication system based on the random configuring of the node; and
   randomly re-configuring the node in one of the master mode and the slave mode based on a negative determination that the node is in the LINK-UP state with the selected node.

2. The method of claim 1, further comprising:
   setting a random timer in the node based on the random configuring of the node in one of the master mode and the slave mode; and
   determining if the random timer has expired, wherein the random re-configuring of the node in one of the master mode and the slave mode is further based on a determination that the random timer has expired.

3. The method of claim 1, further comprising:
   determining the node is in one of a power measurement modulation session (PMMS) state or a TRAINING state based on the random configuring of the node and a completion of the HANDSHAKE state.

4. The method of claim 3, wherein a last-generated-random configuration of the node to one the master mode and the slave mode is a current mode, the method further comprising:
   setting a link cache in the node to the current mode based on the determination that the node is in one of the PMMS state or the TRAINING state.

5. The method of claim 4, the method further comprising:
   determining the node is in a LINK-UP state based on a completion of the HANDSHAKE state; and
   setting a flash file in the node to the current mode, based on the determination that the node is in the LINK-UP state with the selected node.

6. The method of claim 5, wherein the mode set in the flash file is a specific mode, wherein, if the LINK-UP state is disrupted by a glitch, the method further comprising:
   determining if the specific mode is the current mode; and
   configuring the node to the specific mode based on a negative determination that the specific mode is the current mode.

7. The method of claim 6, further comprising:
   setting a waiting timer if the LINK-UP state is disrupted by the glitch.

8. The method of claim 1, wherein the node is a first node and the selected node is a second node in the communication system, the method further comprising:
   determining the second node is in the HANDSHAKE state;

randomly configuring the second node in one of the master mode and the slave mode based on a determination that the second node is in the HANDSHAKE state;

determining if the second node is in the LINK-UP state with the first node based on the random configuring of the second node; and randomly re-configuring the second node in one of the master mode and the slave mode based on a negative determination that the second node is in the LINK-UP state with the first node.

9. The method of claim 8, further comprising:

setting a random timer in the second node based on the random configuring of the second node in one of the master mode and the slave mode; and determining if the random timer has expired, wherein the random re-configuring of the second node in one of the master mode and the slave mode is further based on a determination that the random timer has expired.

10. The method of claim 8, further comprising:

determining the second node is in one of the power measurement modulation session (PMMS) state or the TRAINING state based on the random configuring of the second node and a completion of the HANDSHAKE state in the second node.

11. The method of claim 10, wherein a last-generated-random configuration of the second node to one the master mode and the slave mode is a current mode, the method further comprising:

setting a link cache in the second node to the current mode based on the determination that the second node is in one of the PMMS state or the TRAINING state.

12. The method of claim 11, the method further comprising:

determining the second node is in the LINK-UP state based on a completion of the HANDSHAKE state of the second node; and setting a flash file in the second node to the current mode, based on the determination that the second node is in the LINK-UP state with the first node.

13. The method of claim 12, wherein the mode set in the flash file is a specific mode, wherein, if the LINK-UP state is disrupted by a glitch, the method further comprising:

determining if the specific mode is the current mode; and configuring the second node to the specific mode based on a negative determination that the specific mode is the current mode.

14. The method of claim 13, further comprising:

setting a waiting timer in the second node if the LINK-UP state is disrupted by the glitch.

15. A node capable of independent auto-negotiation to reduce link-up time with at least one other node, the node comprising:

at least one physical layer device;

a processor communicatively coupled to the at least one physical layer device of the node, the processor configured to randomly configure the node in one of a slave mode or a master mode during an auto-negotiation process and to randomly re-configure the node in one of the slave mode or the master mode during the auto-negotiation process if the node remains in a HANDSHAKE state for more than a randomly selected time, wherein a last-generated-random configuration of the node as one the master mode and the slave mode is a current mode;

a link cache to store the current mode of the node when the current state of the node is in one of a power measurement modulation session (PMMS) state or a TRAINING state;

a flash file to store the current mode of the node when the current state of the node is a LINK-UP state; and at least one timer to limit the auto-negotiation time.

16. The node of claim 15, wherein the at least one timer includes a waiting timer to limit auto-negotiation time if a connection to the at least one other node is lost.

17. The node of claim 16, wherein the at least one timer further includes a random timer that is randomly set based on the random configuring of the node in one of the master mode or the slave mode.

18. The node of claim 15, wherein the node is a digital subscriber line (DSL) node in a digital subscriber line and wherein the at least one other node is a digital subscriber line (DSL) node.

19. A digital subscriber line communication system comprising:

a first digital subscriber line (DSL) node communicatively coupled to a second DSL node via a DSL link, the first and second DSL nodes including:

a processor communicatively coupled to at least one physical layer device of the node, the processor configured to randomly configure the node in one of a slave mode or a master mode during an auto-negotiation process and to randomly re-configure the node in one of the slave mode or the master mode during the auto-negotiation process if a LINK-UP state fails to be established;

a link cache to store a current mode of the node during the auto-negotiation process when a current state of the node is a HANDSHAKE state;

a flash file to store the current mode of the node after a LINK-UP state is established; and at least one timer to limit the auto-negotiation time, wherein the processors in the first DSL node and in the second DSL node independently:

determine if the respective node is in a HANDSHAKE state;

randomly configure the respective node in one of the master mode and the slave mode based on a positive determination that the node is in the HANDSHAKE state;

determining if the respective node is in a LINK-UP state based on the random configuring of the respective node; and randomly re-configuring the respective node in one of the master mode and the slave mode based on a negative determination that the respective node is in the LINK-UP state.

20. The node of claim 19, wherein the at least one tinier includes a waiting timer to limit auto-negotiation time if a connection to the at least one other node is lost.

21. The node of claim 20, wherein the at least one timer further includes a random timer, wherein the first DSL node and the second DSL node are further configured to independently set a random-waiting time on the random timer in the respective node based on the random configuring of the respective node in one of the master mode and the slave mode.

22. The digital subscriber line communication system of claim 21, wherein the respective processors in the first DSL node and the second DSL are further configured to reset a random-waiting time for the respective node based on the random re-configuring of the node in one of the master mode and the slave mode.

* * * * *